Figure 1:
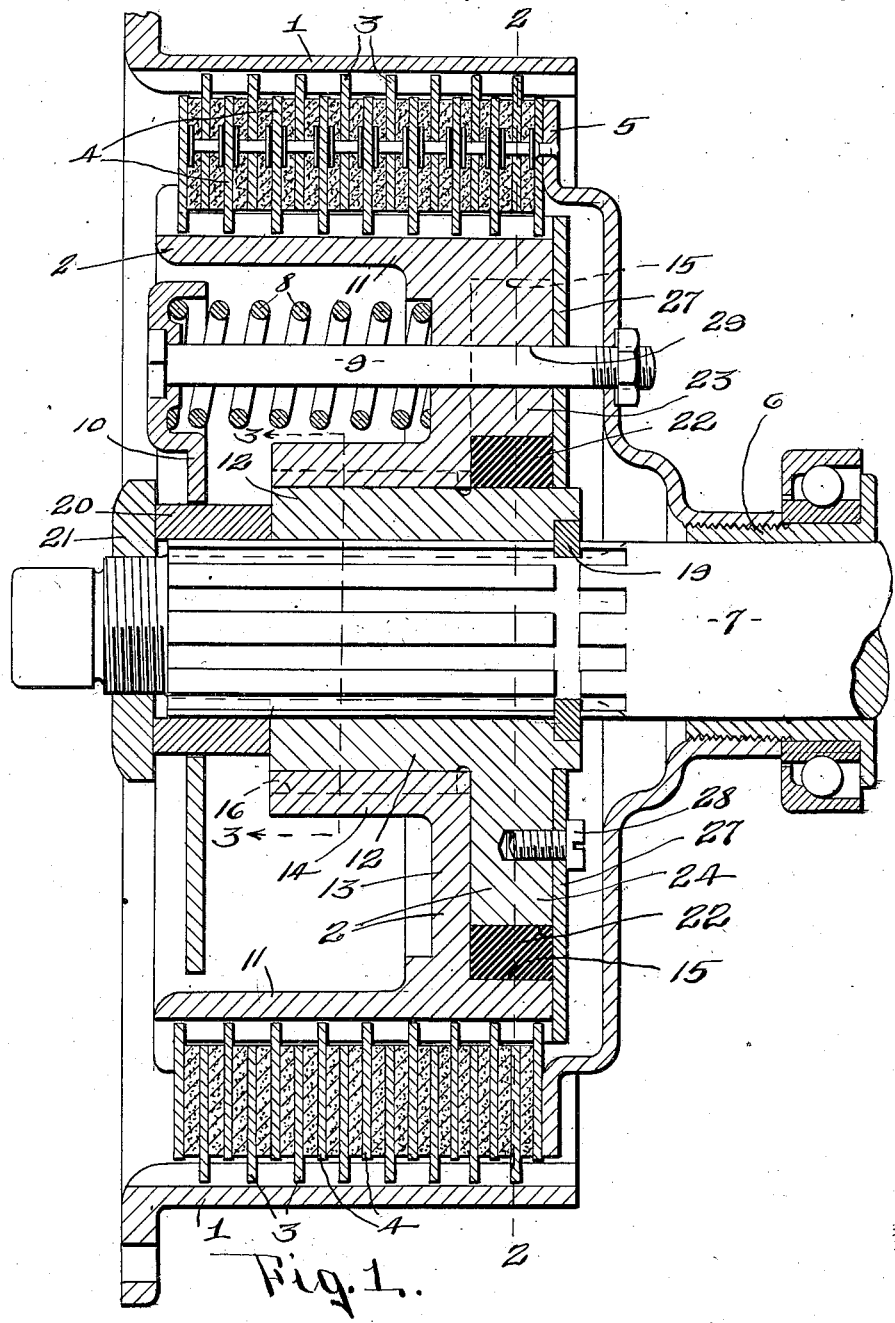

April 28, 1931.  C. B. SPASE  1,803,077
VIBRATIONLESS CLUTCH CONSTRUCTION
Filed Dec. 24, 1926  2 Sheets-Sheet 1

INVENTOR.
Charles B. Spase
BY Parsons & Bodell
ATTORNEYS

April 28, 1931.  C. B. SPASE  1,803,077
VIBRATIONLESS CLUTCH CONSTRUCTION
Filed Dec. 24, 1926  2 Sheets-Sheet 2
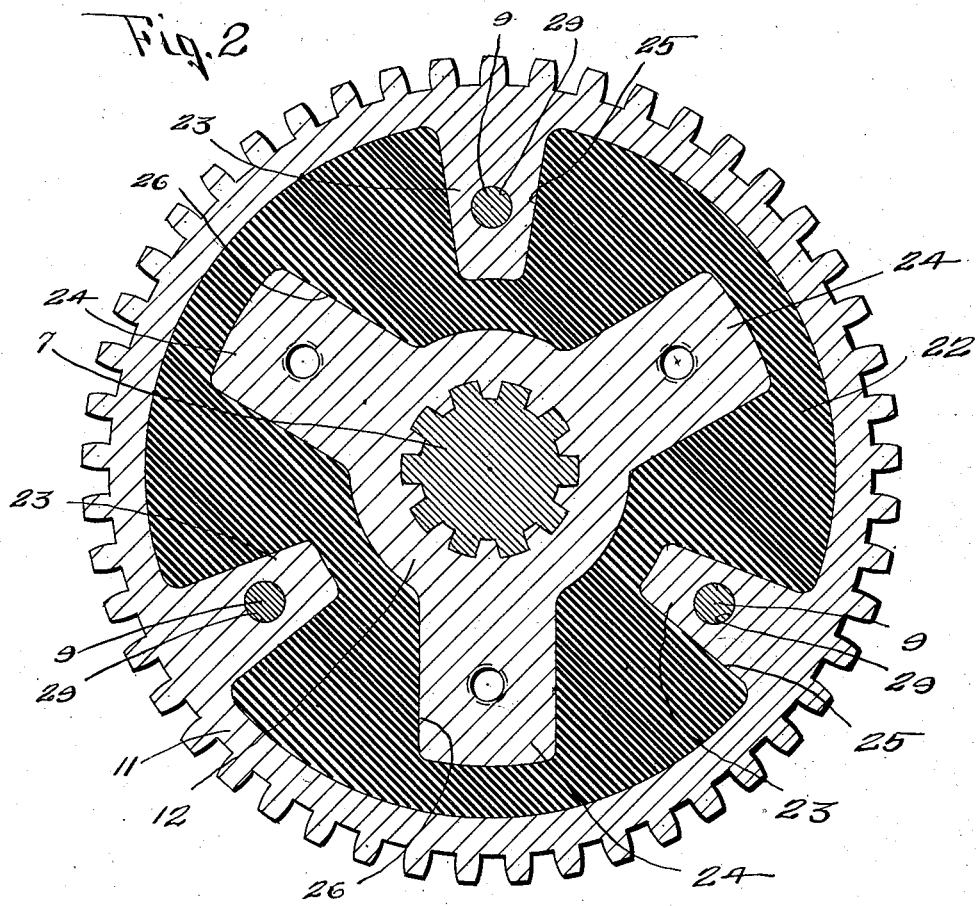
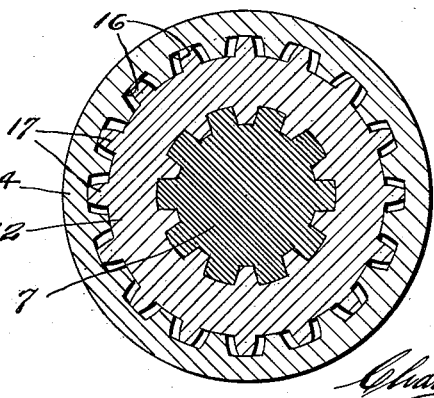
INVENTOR.
Charles B. Spase
BY Parsons & Brodell
ATTORNEYS.

Patented Apr. 28, 1931

1,803,077

UNITED STATES PATENT OFFICE

CHARLES B. SPASE, OF SYRACUSE, NEW YORK, ASSIGNOR TO BROWN-LIPE GEAR COMPANY, OF SYRACUSE, NEW YORK, A CORPORATION OF NEW YORK

VIBRATIONLESS CLUTCH CONSTRUCTION

Application filed December 24, 1926. Serial No. 156,785.

This invention relates to clutches and has for its object a particularly simple, economical, efficient and durable construction of one of the clutch members whereby vibrations are absorbed and noises due to looseness that may be initially present or which may develop during the use of the clutch are deadened.

The invention consists in the novel features and in the combinations and constructions hereinafter set forth and claimed.

In describing this invention reference is had to the accompanying drawings in which like characters represent corresponding parts in all the views.

Figure 1 is a longitudinal vertical sectional view of one form of clutch embodying my invention.

Figures 2 and 3 are respectively sectional views on lines 2—2 and 3—3, Figure 1.

I have here shown my invention as embodied in a friction clutch of the multiple disk type and comprising a driving member 1 and a driven member 2, and suitable operating means for clutching and declutching said members.

The driving member 1 is here illustrated as an outer drum, which is associated with, or secured to, or in any other way formed with or assembled with a driving shaft or fly wheel of an engine. The driving and driven members are connected through two sets of interleaved disks 3, 4 interlocked respectively with the driving and driven members and these disks are pressed together for the purpose of clutching the two sections together by means of a pressure plate 5 secured to a throwout collar 6 slidable along the clutch shaft 7 on which the inner clutch member 2 is mounted, and the pressure plate 5 is acted upon by spring means usually a plurality of springs as the spring 8 located within the inner clutch member 2, each spring encircling a tie rod 9 connected at one end to the pressure plate and at its other end to a spring abutment 10 mounted on the shaft 7. The spring 8 thrusts at one end against the web of the inner member or drum 2 and at its outer end against the spring abutment. The inner end of the shaft 7 is journalled in a pilot bearing in the fly wheel or the engine shaft as will be understood by those skilled in the art.

The clutch construction thus far described, per se, forms no part of this invention.

This invention comprises the forming of one of the clutch members of inner and outer sections and means of yielding material, usually rubber, arranged between the sections to transmit the torque from one section to the other.

In the illustrated embodiment of my invention, the inner member 2 is formed of inner and outer sections, the outer section being a drum 11 which is mounted on the inner section 12. The means for yieldingly transmitting the torque from one section to the other is preferably a third section interlocked respectively with the outer and inner sections 11 and 12.

In the illustrated embodiment of my invention, one of the sections 11 or 12 is formed with an annular recess in one end thereof, and each of the sections is formed with projections extending into the recess and spaced apart in the direction of rotation of the clutch, and the third section which is preferably of rubber, is annular in general form and located in the recess and provided with spaces which receive and fit the projections. Also the outer and inner sections are formed with interlocking projections and grooves extending lengthwise of said sections, the grooves being of greater width than the projections whereby there is a limited lost motion in the direction of rotation, between the sections, the taking up of which lost motion is yieldingly resisted by the yielding or resilient third section.

The outer section or drum 11 as here illustrated, is formed with a web 13 and an internal hub 14 and also the recess 15 for receiving the third section in the rear of the web, the recess surrounding the rear end of the inner section 12. The hub 14 and the portion of the inner section 12 surrounded thereby are provided with interlocking projections and grooves, the grooves 16 being of greater width than the projections 17 whereby a limited lost motion is provided between the inner section 12 and the outer section 11. Usually there is a clearance or space of about $\frac{3}{32}$ of an inch on each side of the tongues or projections 17, thus allowing the third section to compress in either direction the amount of this clearance and limiting further compression when the clearance or lost motion is taken up.

The inner section 12 is also splined to the shaft 7 and is held from endwise movement thereon in one direction by an annular key or abutment 19 and in the other direction by a sleeve 20 on the shaft 7, which sleeve is held from movement by a nut 21 screwing on the shaft 7. The spring abutment 10 surrounds the sleeve 20.

As here illustrated, the third section is annular in general form and located in the recess 15 and although it is preferably formed at one piece, it may be made up of several blocks and need not necessarily be continuous, but it is preferably continuous and substantially fits or is confined by the recess. The sections 11 and 12 are interlocked with this third section 22 by projections thereon extending into the recess 15. Preferably, the outer section is formed with internal projections 23 extending radially into the recess, and the inner section 12 is provided with external projections 24 extending into the recess and spaced apart from and opposed to the projections 23, and a third section 22 is provided with notches or spaces 25 and 26 for receiving and fitting these projections 23, 24. The space between the opposing projections is comparatively large to permit a comparatively large block of rubber to be interposed between said projections. The projections 23, 24 terminate short of the inner and outer curved walls of the recess, and the third section extends across the ends of the projections. That is, the block of rubber preferably conforms to the recess or is confined at its inner and outer edges by the outer annular wall of the recess and the periphery of the inner section 12.

The third section 22 is also confined to some extent from expansion in a direction at an angle to the torque or lengthwise of the axis of the clutch, by suitable means as a cover plate 27 for the outer side of the recess. This cover 27 is secured to one of the sections, preferably the inner section as by screws 28 extending through the cover and threading into the external projections 24 on the inner section 12. The tie rods 9 heretofore mentioned, extend through holes 29 in the internal projections 23 of the outer section 11.

The throw out collar 6 is actuated by the usual yoke and pedal members to declutch the clutch against the action of the springs 8.

In operation, the torque is transmitted through the third section of yielding or resilient material as rubber until the lost motion between the tongues and grooves 16, 17 is taken up and owing to this third section of rubber, vibrations are absorbed and sounds deadened and the effect of any looseness neutralized.

What I claim is:

1. A clutch member comprising outer and inner sections, the outer section having internal projections and the inner section having external projections spaced apart in the direction of rotation from the projections of the outer section and blocks of yielding material between the projections of said sections for transmitting the torque from one section to the other, and means separate from the projections of the sections for positively limiting the yielding movement of the sections.

2. A clutch member comprising inner and outer sections having interlocking tongues and grooves, the grooves being of greater dimension than the tongues whereby a lost motion in the direction of rotation of said members is provided, and the inner and outer sections also having additional spaced apart projections and blocks of yielding material interposed between the latter projections to yieldingly resist the taking up of such lost motion.

3. A clutch member comprising inner and outer sections, said sections being provided with interlocking projections and grooves, the projections being of less dimension than the grooves, whereby a limited lost motion is provided, the sections also having respectively external and internal projections spaced apart and opposed to each other in the direction of rotation, and an intermediate section of yielding material annular in general form and provided with grooves fitting the projections of the inner and outer sections.

4. A clutch drum comprising inner and outer sections, the outer section having a recess in one end, and an internal hub and also having projections extending into the recess, the hub being mounted on the inner section, and the hub and the inner section being formed with interlocking projections and grooves extending lengthwise thereof, the grooves being of greater width than the projections whereby a limited lost motion is provided, the inner section also having projections in the recess and spaced apart from the former projections and a third section of yielding material located in the recess and having spaces for receiving and fitting the projections of the outer section extending into said recess, and a cover closing the outer end of the recess.

5. A clutch drum comprising inner and outer sections, the outer section having a recess in one end, and an internal hub and also having projections extending into the recess, the hub being mounted on the inner section and the hub and the inner section being formed with interlocking projections and grooves extending lengthwise thereof, the grooves being of greater width than the projections whereby a limited lost motion is provided, the inner section also having projections in the recess and spaced apart from the former projections and a third section of yielding material located in the recess and having spaces for receiving and fitting the projections extending into said recess and a cover closing the outer end of the recess, the third section substantially fitting the recess and the cover abutting against the outer side of the third section.

6. A clutch drum comprising inner and outer sections, the outer section having a recess in one end and an internal hub and also having internal projections extending into the recess, the hub being mounted on the inner section and the hub and the inner section being formed with interlocking projections and grooves extending lengthwise thereof, the grooves being of greater width than the projections whereby a limited lost motion is provided, the inner section also having projections in the recess spaced apart from the former projections, and a third section of yielding material located in the recess and having spaces for receiving and fitting the projections extending into said recess, and means for holding the third section from expansion in a direction lengthwise of the axis of the clutch.

In testimony whereof, I have hereunto signed my name at Syracuse, in the county of Onondaga and in the State of New York, this 21st day of December, 1926.

CHARLES B. SPASE.